(12) United States Patent
Wang et al.

(10) Patent No.: US 7,926,039 B2
(45) Date of Patent: Apr. 12, 2011

(54) REACHABILITY ANALYSIS FOR PROGRAM VERIFICATION

(75) Inventors: Chao Wang, Plainsboro, NJ (US);
Zijiang Yang, Northville, MI (US);
Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1049 days.

(21) Appl. No.: 11/692,421

(22) Filed: Mar. 28, 2007

(65) Prior Publication Data

US 2008/0016497 A1 Jan. 17, 2008

Related U.S. Application Data

(60) Provisional application No. 60/743,850, filed on Mar. 28, 2006.

(51) Int. Cl.
*G06F 9/44* (2006.01)
*G06F 9/45* (2006.01)
(52) U.S. Cl. .................... 717/126; 717/141
(58) Field of Classification Search .......... 717/126, 717/141
See application file for complete search history.

(56) References Cited

U.S. PATENT DOCUMENTS

| | | | |
|---|---|---|---|
| 7,346,486 B2* | 3/2008 | Ivancic et al. ............... | 703/22 |
| 7,363,202 B2* | 4/2008 | Campbell et al. ............ | 703/2 |
| 7,421,680 B2* | 9/2008 | DeLine et al. .............. | 717/126 |
| 2001/0010091 A1* | 7/2001 | Noy ............................ | 716/4 |
| 2004/0205394 A1* | 10/2004 | Plutowski ..................... | 714/21 |
| 2005/0102723 A1* | 5/2005 | Van Den Nieuwelaar et al. ....................... | D18/1 |
| 2005/0229044 A1* | 10/2005 | Ball ............................ | 714/38 |
| 2005/0235257 A1* | 10/2005 | Ball et al. .................. | 717/108 |
| 2006/0179383 A1* | 8/2006 | Blass et al. ................ | 714/738 |

OTHER PUBLICATIONS

Boel et al. "On Forbidden State Problems for a Class of Controlled Petri Nets", IEEE Transactions on Automatic Control, vol. 40, No. 10, Oct. 1995, pp. 1717-1731.*
Alberto Bemporad, "Modeling, Control, and Reachability Analysis of Discrete-Time Hybrid Systems" DISC School—Apr. 2003, pp. 1-82.*
Alexander E. Kostin, "Reachability Analysis in T-Invariant-Less Nets", IEEE Transactions on Automatic Control, vol. 48, No. 6, Jun. 2003. pp. 1019-1064.*
Narayan et al. "Reachability Analysis Using Partitioned-ROBDDs", Fujitsu Laboratories of America, 1997 IEEE, pp. 388-393.*
P.Cousot and R.Cousot, "Static Determination of Dynamic Properties of Programs" in International Symposium on Programming; pp. 106-126; 1976.
E.M. Clarke and E.A.Emerson; "Design and Synthesis of Synchronization Skeletons Using Branching Time Temporal Logic"; in Proceedings of Workshops on Logics of Programs; pp. 57-71; Springer, 1981.
J.P. Quielle and J.Sifakis, "Specifications and Verification of Concurrent systems in CESAR", in Symposium on Programming, 1981.

(Continued)

*Primary Examiner* — Anna Deng
(74) *Attorney, Agent, or Firm* — Jeffrey J. Brosemer; Joseph Kolodka

(57) ABSTRACT

An improved method for automatically improving the precision of an extrapolation operator used, for example, in software program verification in connection with the static analysis and model checking of the software programs which rely on fix-point computation. In particular, a new extrapolation-with-care-set operator, together with a method for gradually increasing the precision of this operation by tightening the care set.

6 Claims, 4 Drawing Sheets

OTHER PUBLICATIONS

P.Cousot and N. Halbawachs; "Automatic Discovery of Linear Restraints Among Variables of a Program"; in Symposium on Principles of Programming Languages; pp. 84-96; 1978.

N. Halbwachas, Y.E.Proy, and P.roumanoff, "Verification of Real Time Systems Using Linear Relation Analysis", Formal Methods in Systems Design, 11(2); 157-185, 1977.

N.Halbwachs, "Delay Analysis in Synchronous Programs", in Computer Aided Verification, pp. 333-346, Springer, 1993, LNCS 697.

T.R.Gerber and W.Pugh, "Symbolic Model Checking of Infinite State Systems using Pressberger Arithmetic", in Computer Aided Verification, pp. 400-411, Springer, 1997, LNCS 1254.

R.Bagnara, P.M. Hill and E.Zaffanella, "Widening Operators for Powerset Domains", in Verification, Model Checking and Abstract Interpretation, pp. 135-148, Springer, 2004, LNCS 2937.

T.Bultan, R.Gerber, and C.League, "Verifying Systems with Integer Constraints and Boolean Predicates: A Composite Approach", in International Symposium on Software Testing and Analysis, pp. 113-123, 1998.

T.A. Henzinger and P.H.Ho, "A Note on Abstract Interpretation Strategies for Hybrid Automata", in Hybrid Systems II, pp. 252-264, Springer 1995, LNCS 999.

F.Bourdoncle, "Abstract Interpretation by Dynamic Partitioning", J.Funct.Program., 2(4); 407-423; 1992.

B.Jeannet, N.Halbwachs and P.Raymond, "Dynamic Partitioning in Analysis of Numerical Properties", in International Symposium on Static Analysis, pp. 39-50; Springer 2005.

R.Bagnara, P.M.Hill, E.Ricci and E.Zaffanella, "Precise Widening Operators for Convex Polyhedra", in International Symposium on Static Analysis, pp. 337-354, Springer 2004.

E.Clarke, O.Grumberg, S.Jha, Y.Lu and H.Veith, "Counterexample-guided Abstraction Refinement", in Computer Aided Verification, pp. 154-169, Springer, 2000, LNCS 1855.

S.Graf and H.Saidi, "Construction of Abstract State Graphs with PVS", in Computer Aided Verification, pp. 72-83, Springer 1997, LNCS 1254.

T.A.Henzinger, R.Jhala, R.Majumdar and G.Sutre, "Lazy Abstraction" in Principles of Programming Languages, pp. 58-70, 2002.

F.Ivanicic, I.Shlyakhter, A.Gupta, M.K.Ganai, Z.Yang and P.Ashar, "F=SOFT Software Verification Platform" in Computer Aided Verification, pp. 301-306, Springer, 2005, LNCS 3576.

R.Giacobazzi, F.Ranzato, and F.Scozzari, "Making Abstract Interpretations Complete", J.ACM, 47(2):361-416, 2000.

B.S.Gulavani and S.K.Rajamani, "Counterexample Driven Refinement for Abstract Interpretation", in Tools and Algorithms for the Construction and Analysis of Systems, pp. 474-488, Springer 2006, LNCS 3920.

\* cited by examiner

REACHABILITY ANALYSIS FOR PROGRAM VERIFICATION

CROSS REFERENCE TO RELATED APPLICATIONS

This application claims the benefit of U.S. Provisional Patent Application No. 60/743,850 filed Mar. 28, 2006 the entire contents and file wrapper of which are incorporated by reference as if set forth at length herein.

FIELD OF THE INVENTION

This is a computer implemented invention which relates generally to software analysis. More particularly it relates to an iterative refinement method for fixpoint computation employing extrapolation operators with care sets which we show particular application to software program verification.

BACKGROUND OF THE INVENTION

Static analysis based on abstract interpretation [See, e.g., P. Cousot and R. Cousot, "Static Determination of Dynamic Properties of Programs," in International Symposium on Programming, pp. 106-126, 1976] and model checking [See, e.g., E. M. Clarke and E. A. Emerson, "Design and Synthesis of Synchronization Skeletons Using Branching Time Temporal Logic," in Proceedings of Workshop on Logics of Programs, pp. 57-71, Springer, 1981; J. P. Quielle and J. Sifakis, "Specifications and Verification of Concurrent Systems in CESAR", In Symposium on Programming, 1981] are popular techniques for program verification. They both rely on fixpoint computation, with the former heavily employing widening to ensure termination. [See, e.g., P. Cousot and N. Halbawachs, "Automatic Discovery of Linear Restraints Among Variables of a Program", In Symposium on Principles of Programming Languages, pp. 84-96, 1978.]

The precision of a widening operator is crucial for the effectiveness of abstract interpretation. Often a widening operator is carefully designed by a user a priori for an abstract domain, and if it does not provide enough precision, the user either accepts the result as inconclusive or has to redesign the operator.

Widening for convex polyhedra was introduced for numerical relational analysis and later extended to verification of integer-valued programs and linear hybrid systems [See, e.g., N. Halbwachs, Y. E., Proy and P. Roumanoff, "Verification of Real-Time Systems Using Linear Relation Analysis", Formal Methods in Systems Design, 11(2); 157-185, 1997]. The operator was generalized and subsequently applied to powersets (or finite unions) of convex polyhedra. [See, e.g., N. Halbwachs, "Delay Analysis in Synchronous Programs," In Computer Aided Verification, pp. 333-346, Springer, 1993, LNCS 697; T. R. Gerber and W. Pugh, "Symbolic Model Checking of Infinite State Systems using Pressberger Arighmetic," In Computer Aided Verification, pp. 400-411, Springer, 1997, LNCS 1254; R. Bagnara, P. M. Hill, and E. Zaffanella, "Widening Operators for Powerset Domains," In Verification, Model Checking and Abstract Interpretation, pp. 135-148, Springer, 2004, LNCS 2937; and T. Bultan, R. Gerber, and C. League, "Verifying Systems with Integer Constraints and Boolean Predicates: A Composite Approach," In International Symposium on Software Testing and Analysis, pp. 113-123, 1998] Approximation techniques were also studied where an extrapolation operator is introduced [See, e.g., T. A. Henzinger and P. H. Ho, "A Note on Abstract Interpretation Strategies for Hybrid Automata, "In Hybrid Systems II, pp 252-264, Springer 1995, LNCS 999. The difference between widening and extrapolation is that the latter does not guarantee termination. The widening precision can be increased by partitioning methods. [See, e.g, F. Bourdoncle, "Abstract Interpretation by Dynamic Partitioning", J. Funct. Program., 2(4): 407-423, 1992; B. Jeannet, N. Halbwachs and P. Raymond, "Dynamic Partitioning in Analysis of Numerical Properties" In International Symposium on Static Analysis, pp. 39-50, Springer 2005,]. More recently, a widening operator was produced by combining several known heuristics and using convex widening as a last resort. [See, e.g., R. Bagnara, P. M. Hill, E. Ricci and E. Zaffanella, "Precise Widening Operators for Convex Polyhedra," In International Symposium on Static Analysis", pp. 337-354, Springer, 2004] In all of these previous works, no automatic refinement was involved.

In model checking, counterexample guided refinement [See., e.g., E. Clarke, O. Grumberg, S. Jha, Y. Lu and H. Veith, "Counterexample-guided Abstraction Refinement," In Computer Aided Verification, pp. 154-169, Springer, 2000, LNCS 1855] has been used together with predicate abstraction [See, e.g., S. Graf and H. Saidi, "Construction of Abstract State Graphs with PVS," In Computer Aided Verification, pp. 72-83, Springer 1997, LNCS 1254] to verify software programs [See, e.g., T. A. Henzinger, R. Jhala, R. Majumdar, and G. Sutre, "Lazy Abstraction", In Principles of Programming Languages", pp. 58-70, 2002; F. Ivanicic, I. Shlyakhter, A. Gupta, M. K. Ganai, Z. Yang, and P. Ashar", "F-SOFT Software Verification Platform", In Computer Aided Verification pp. 301-306, Springer, 2005, LNCS 3576].

As is known by those skilled in the art, predicate abstraction relies on finite sets of predicates to define abstract domains, and therefore can be viewed as an instance of domain refinement in abstract interpretation [R. Giacobazzi, F. Ranzato, and F. Scozzari, "Making Abstract Interpretations Complete", J. ACM, 47(2):361-416, 2000]. However, finite abstractions in general are not as powerful as an infinite abstract domains with widening for Turing equivalent programming languages.

Recently [See, e.g., B. S. Gulavani and S. K. Rajamani, "Counterexample Driven Refinement for Abstract Interpretation", In Tools and Algorithms for the Construction and Analysis of Systems, pp. 474-488, Springer, 2006, LNCS 3920], a counterexample driven refinement method for abstract interpretation has been proposed, which identifies the fixpoint steps at which precision loss happens due to widening in forward fixpoint computation, and then to use the least upper bound (convex hull for convex polyhedra) instead of widening at those steps. In effect, this refinement procedure simply skips the widening at particular steps (the least upper bound of two consecutive sets P and Q of a fixpoint computation is actually Q, since $P \subseteq Q$).

SUMMARY OF THE INVENTION

An advance is made in the art according to the principle of the present invention directed to a refinement procedure that—in sharp contrast to the prior art—does not merely skip the over-approximation; instead, it produces a refined care set to guide the direction-of-growth in over-approximation at the next iteration of the refinement loop.

Viewed from a first aspect, a new operator called extrapolation with a care set is produced. Given two sets $P \subseteq Q$ and a care set C such that $Q \cap C = \emptyset$, the extrapolation $\overline{of}$ P with respect to Q under C is a set S such that $Q \subseteq S$ and $S \cap C = \emptyset$. In a reachability computation, the care set $\overline{C \text{ is}}$ initially empty—in this case the new operator can be substituted by normal widening whose result $S=P\nabla Q$ satisfies both $Q\subset S$ and $S\cap C=\emptyset$. If a given invariant property $\psi$ holds in the over-approximated reachable set, then the property is proved. Otherwise, we intersect this over-approximated set with $\neg\psi$, pick a subset, and start a precise backward analysis in order to build a counterexample. If a counterexample can be found, then we report it as a real error; otherwise, it remains to be decided. In the latter case, we analyze the spurious counter-example and produce a new care set C. The expanded care set C is used with extrapolation to compute a new reachability fixpoint. This iterative refinement process continues until either enough precision is achieved to derive a conclusive result, or the computing resources are exhausted. Advantageously, the entire procedure is automatic, whereas for the existing widening techniques, the user has to redesign the widening operator manually when a false bug is reported.

Viewed from another aspect, the present invention is directed to a new set of methods for implementing the new operator in the domain of convex polyhedra. For two power-sets P and Q of convex polyhedra, we apply the proposed operator to individual pairs $P_i \in P$ and $Q_j \in Q$ only when $P_i \subset Q_j$. In practice, the use of a care set can significantly increase the precision of program analysis in the polyhedral powerset domain. We also introduce two new operators called interpolate and restrict to heuristically simplify the polyhedral representations. Applying these two operators during forward and backward reachability fixpoint computations does not cause a loss in precision.

DETAILED DESCRIPTION

Figure 1:
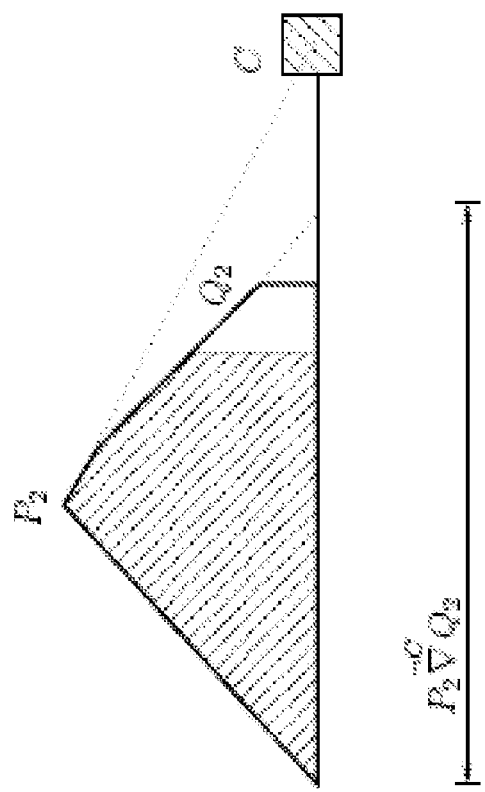
FIG. 1 is an example using a care set with extrapolation according to the present invention.
Figure 1:
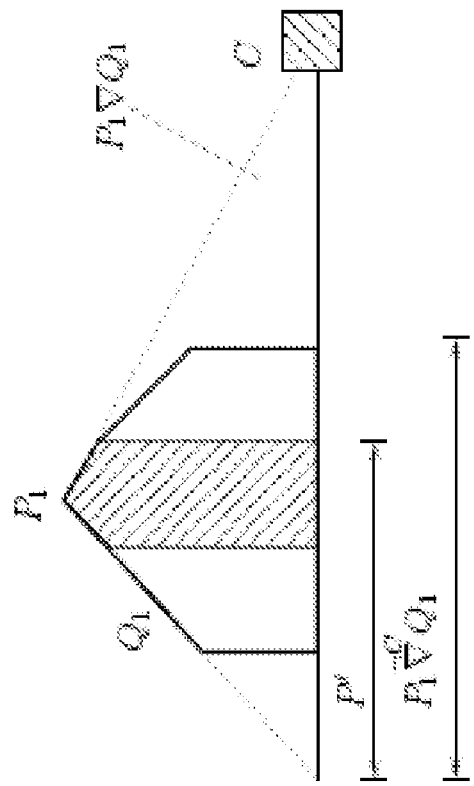

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Abstract Interpretation

Within the general framework of abstract interpretation, the abstract postcondition and precondition operations, as well as the least upper bound, may all induce approximations. Widening is used to enforce and/or to accelerate the termination of fixpoint computations since in general the computation may not have a fixpoint or have one that cannot be reached in a finite number of iterations.

Widening A widening operator on a partial order set $(L, \sqsubseteq)$ is a partial function $\nabla: L \times L \to L$ such that
1. for each x, $y \in L$ such that $x\nabla y$ is defined, $x \sqsubseteq x\nabla y$ and $y \sqsubseteq x\nabla y$;
2. for all ascending chains $y_0 \sqsubseteq y_1 \sqsubseteq \ldots$, the ascending chain defined by $x_0 := y_0$ and $\overline{x_{i+1}} := \overline{x_i} \nabla y_{i+1}$ for $i \geq 0$ is not strictly increasing.

An operator satisfying the first condition but not the strictly increasing requirement of the second condition is called an extrapolation. In the sequel, we use $\nabla$ to denote both widening and extrapolation when the context is clear. Since there is more freedom in choosing an actual implementation of an extrapolation operator than widening, it is possible for extrapolation to produce a tighter upper-bound set than widening.

For program verification, we consider a powerset domain of convex polyhedra over a linear target program, where only $\nabla$ causes the precision loss (i.e., precondition, postcondition, and least upper bound are precise). We want to compute the reachability fixpoint $F = \mu Z I \cup post(Z)$, where I is the initial predicate and $post(Z)$ is the postcondition of Z with respect to a set of transfer functions. In general, Z is a finite union of convex polyhedra. We define $\psi$ as a predicate that is expected to hold in the program (i.e., the property of interest), then program verification amounts to checking whether $F \sqsubseteq \psi$. To apply widening/extrapolation in the reachability computation, let $y_{i+1} = x_i \cup post(x_i)$; that is, $$y_o = Ix_0 = I$$

$$y_1 = I \cup post(I) x_1 = I\nabla y_1$$

$$y_2 = x_1 \cup post(x_1) x_2 = x_1 \nabla y_2$$

$$y_3 = \ldots$$

Reachability computation in the concrete domain, as is often used in symbolic model checking, can be viewed as a special case (by making $x_i = y_i$ for all $i \geq 0$).

Polyhedral Abstract Domain

The polyhedral abstract domain was first introduced in to capture numerical relations over integers. Let Z be the set of integer numbers and $Z^n$ be the set of all n-tuples. A linear inequality constraint is denoted by $a^T \cdot x \leq b$, where x, $a \in Z^n$ are n-tuples (x is the variable) and $b \in Z$ is a scalar constant. A polyhedron P is a subset of $Z^n$ defined by a finite conjunction of linear inequality constraints, $P = \{x \in Z^n | \forall i: a_i^T \cdot x \leq -b_i\}$. We choose to use this constraint system representation in order to be consistent with our actual implementation, which is based on the Omega library [See, e.g, W. Pugh et. al., "The Omega Project", University of Maryland, http://www.cs.umd.edu/projects/omega/]. An alternative would be to define P as a generator system comprising a finite set of vertices, rays, and lines. Some implementations [See, e.g., The Computer Science Group, "The Parma Polyhedra Library", University of Parma, Italy, http://www.cs.unipr.it/ppl/] choose to maintain both to take advantages of their complementing strengths and to avoid the conversion overhead between the two.

The first widening operator for this abstract domain is often referred to as standard widening. For ease of reference, we follow this convention herein.

Standard Widening. Let P and Q be two polyhedra such that $P \subseteq Q$; the widening of P with respect to Q, denoted by $P \triangledown Q$, is computed as follows: when P is empty, return Q; otherwise, remove from P all inequalities not satisfied by Q and return.

The intuition behind standard widening is to predict the directions of growth from P to Q and then drop any constraint of P in these directions. The finiteness of the first polyhedron (where widening starts) ensures termination.

Widening Up-to. Let P and Q be two polyhedra such that $P \subseteq Q$, and let M be a finite set of linear constraints. The widening up-to operator, denoted by $P \triangledown_M Q$, is the conjunction of the standard widening $P \triangledown Q$ with all the constraints in M that are satisfied by both P and Q.

The widening up-to operator improves standard widening whenever the result is known to lie in a known subset. This subset, or up-to set M, is defined as a set of constraints associated with each control state of a program. For instance, if a variable x is declared to be of subrange type 1 ... 10, then $0 \leq x$ and $x \leq 10$ are added into M. If there exists a loop for (x=0; x<5; x++), then the constraint x<5 is also added into M. It is worth pointing out that the up-to set M as employed in the prior art is fixed. It does not have automatic refinement adaptive to the property under verification.

Extrapolation with a Care Set

We define the care set to be an area within which no extrapolation result should reside in order to avoid false bugs. We use a precise counterexample guided analysis to gradually expand the care set and therefore improve the precision of the extrapolation with care set operator (defined below).

Definition 1: An extrapolation with a care set C on a partial order set $(L, \subseteq)$ is a partial function $\neg C \triangledown : L \times L \rightarrow L$ such that
1. for each $x, y \in L$ such that $x \neg C \triangledown y$ is defined, $x \subseteq x \neg C \triangledown y$ and $y \subseteq x \neg C \triangledown y$;
2. for all ascending chains $y_0 \subseteq y_1 \subseteq \ldots$, the ascending chain defined by $x_0 := y_0$ and $x_{x+} := x_i \neg C \triangledown y_{i+1}$ for $i \geq 0$ satisfies $x_i \cap C = \emptyset$.

Definition 1 is generic since it is not restricted to any particular abstract domain. In this paper, we consider an implementation for the domains of convex polyhedra and their powersets. FIG. 1 provides a motivating example, in which $P_1$ and $Q_1$ are two polyhedra and C is the care set. $P_1$ is represented by the shaded area in the middle, and $Q_1$ is represented by the solid thick lines. From $P_1$ to $Q_1$ there are two directions of growth. The standard widening $P_1 \triangledown Q_1$ would generate the outer triangle that intersects C, thereby introducing false bugs.

We prohibit the growth to the right by using the care set C in our new extrapolation operation. By expanding only towards the left, the extrapolation result, denoted by $P_1 \neg C \triangledown Q_1$ on the left, and $P_2$ (shaded area) on the right, does not intersect C. In the next fixpoint step, we consider the extrapolation of $P_2$ with respect to $Q_2$ (solid thick lines) under the care set C. This time, the standard widening result would not intersect C. Therefore, we prefer that the result of extrapolation with a care set is the same as $P_2 \triangledown Q_2$.

Using the Care Set

We now present an algorithm to compute the extrapolation with care set for convex polyhedra. In the sequel, a linear inequality constraint c is also referred to as a half-space since it represents a set $\{x \in Z^n | a^T \cdot x \leq b\}$. Let c be a constraint of a polyhedron P, and let c' be another constraint (may or may not in P); we use $P_c^{c'}$ to denote the new polyhedron after replacing c with c' in P, and use $P^c$ to denote the new polyhedron after dropping c from P.

Algorithm 1. Let PQ be two polyhedra, and C be a powerset such that $Q \cap C = \emptyset$. The extrapolation of P with respect to Q under the care set C is computed as follows:

1. Build a new polyhedron P': for each constraint c of P whose half-space does not contain Q, if $P^c \cap C = \emptyset$, then drop c.
2. Build a new polyhedron Q': drop any constraint c of Q whose half-space does not contain P'.
3. Return Q' as the result.

An example of applying this algorithm is the extrapolation of $P_1$ with respect to $Q_1$ under the care set C to generate $P_2$ in FIG. 1. In this example, P' is the polyhedron formed by dropping the left-most constraint of $P_1$; then all but the left-most constraint of Q are satisfied by P', so the result Q' is the polyhedron obtained by dropping the left-most constraint of $Q_1$. It is clear that the result does not intersect with C. In general, the result S of Algorithm 1 satisfies $Q \subseteq S \subseteq P \triangledown Q$.

Using this algorithm together with an iteratively improved care set can guarantee that after refinement, the previous precision loss will not appear again. However, if all the directions of growth (indicated by standard widening) are forbidden by the care set C, then Algorithm 1 will return Q. This may lead to postponing the widening operation forever (which may produce a non-terminating sequence). In theory, if desired, we could remedy the termination problem by switching from Algorithm 1 back to standard widening after a sufficient large (but finite) number of fixpoint steps. Another alternative is to use the widening up-to operator instead of extrapolation, by accepting the fact that the refinement of care set may stop making progress. However, there is always a trade-off between precision and termination, since program verification in general is undecidable in the polyhedral domain. Advantageously it is often possible in practice for our technique to achieve both termination and increased precision.

The extrapolation algorithm described above is defined for two convex polyhedra. In program verification, we intend to represent reachable state sets by finite unions of convex polyhedra. We extend the extrapolation operator to the powerset domain as follows: given two powersets P and Q, we apply Algorithm 1 only to individual convex polyhedra pairs $P_i \in P$ and $Q_i \in Q$ such that $P_i \subseteq Q_i$. If $P_i \in P$ is not contained in any $Q_i \in Q$ (no matching pair), we simply use $P_i$. The result is also a powerset. Superficially, this is somewhat similar to the prior art—except that the prior art does not use the care set.

Refining the Care Set

Let $\hat{F}$ be the fixpoint of reachability computation achieved with extrapolation, and $F \subseteq \hat{F}$ be the set of actual reachable states. If the invariant property $\psi$ holds in $\hat{F}$, then $\psi$ also holds in F. If there exists $s \in (\hat{F} \cap \neg \psi)$, it remains to be decided whether $s \in F$, or s is introduced because of extrapolation. If $s \in F$, then we can compute a concrete counterexample. Otherwise, there is a precision loss due to extrapolation.

We compute $\hat{F}$ by extrapolation with care set as follows, $\hat{F}_0 = I$;
$\hat{F}_{i+1} = \hat{F}_i \neg C \triangledown (\hat{F}_i \cup post(\hat{F}_i))$, for $i \geq 0$ until fixpoint.

When the care set C is empty, the extrapolation with care set is equivalent to normal widening. If there is an index fi such that $\hat{F}_{fi} \cap \neg \psi \neq \emptyset$, we stop reachability computation and start the backward counterexample analysis (using precondition computations), $B_{fi} = \hat{F}_{fi} \cap \neg \psi$;
$B_{i-1} = \hat{F}_{i-1} \cap pre(B_i)$ for all $i \leq fi$ and $i > 0$, if $B_i \neq \emptyset$.

If $B_0 \neq \emptyset$, we have found a concrete counterexample inside the sequence $B_0, \ldots, B_{fi}$. If $B_{i-1} = \emptyset$ for an index $i > 0$, then the set $B_i$ is introduced by extrapolation.

Theorem 1 If there exists an index $0 < i < fi$ such that $B_{i-1} = \emptyset$, then the set $B_i$ must have been introduced into $\hat{F}_i$ by extrapolation during forward fixpoint computation.

Proof. Since $\hat{F}_i = \hat{F}_{i-1} \neg C \nabla(\hat{F}_{i-1} \cup post(\hat{F}_{i-1}))$, the set $B_i \subseteq \hat{F}_i$ is added either by postcondition or by extrapolation. Since $B_{i-1} = \emptyset$ and $B_{i-1} \subseteq \hat{F}_{i-1} \cap pre(B_i)$, $B_i$ is not reached from $\hat{F}_{i-1}$ in a postcondition computation step. Therefore $B_i$ is introduced by extrapolation.

We expand the care set (initialized to an empty set) by making $C = C \cup B_i$. After that, extrapolation is allowed only if it does not introduce any erroneous state in $B_i$. Recall that extrapolation estimates directions of growth and then overapproximates growth in these directions up to infinity. $B_i$ provides hints about directions in which over-approximation should be prohibited. With the expanded care set C, we can re-start reachability fixpoint computation from $\hat{F}_{i-1}$ where $B_{i-1} = \emptyset$ and $B_i \neq \emptyset$.

The bad states in set $\hat{F} \cap \neg \psi$ can no longer be reached through the same counterexample. This set may either become empty, or remain non-empty due to a different sequence of $\hat{F}_i$'s. In the latter case, we keep refining the care set until one of the following happens: (1) a concrete counterexample is found and we report that the property $\psi$ fails; (2) the set $\hat{F} \cap \neg \psi$ is empty and we report that the property $\psi$ holds; (3) the limit of computing resources (CPU time or memory) is exceeded; in this case, the property remains undecided.

The correctness of the iterative refinement method is summarized as follows: (1) Since $\hat{F}$ remains an upper-bound of F, if a property fails in F, then it must fail in $\hat{F}$ as well. Therefore, a failing property will never be reported as true in our analysis. (2) Since we report bugs only when the precise backward analysis reaches an initial state, only failing properties can produce concrete counterexamples. Therefore, a passing property will never be reported as false in our analysis.

Improving the Up-To Set

Once the care set C is computed, it can be used to derive the up-to set M for the widening up-to operator. In our iterative refinement framework, the extrapolation operator can be replaced by $\nabla_M$—this can be an alternative way of implementing our iterative widening refinement procedure. Previously in the art, the original $\nabla_M$ operator relies on a fixed set M of linear constraints, which are often derived statically from control conditions of the target program. Given a care set C, we can negate individual constraints of its polyhedra and add them into the up-to set M; that is, $M = \{\neg c_i | c_i \text{ is a constraint of a polyhedron in } C\}$.

Figure 2:
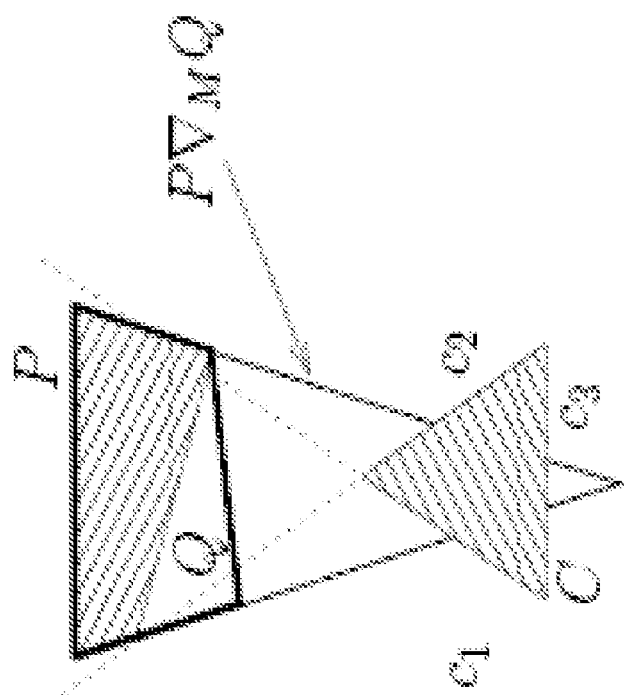
FIG. 2 shows two examples of applying a widening up-to operator.
Figure 2:
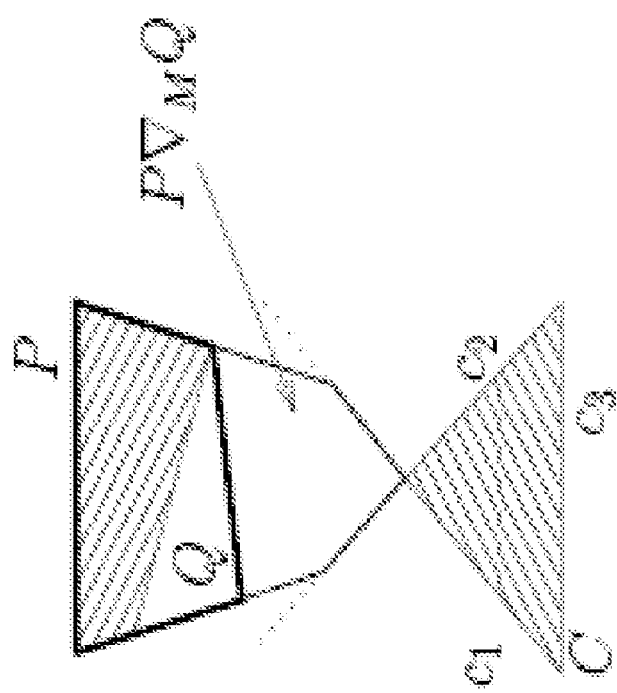

In widening up-to computation $P \nabla_M Q$, the half-space of a constraint in M, or $\neg c_i$, does not have to contain P and Q. If $\neg c_i$ contains P and Q, the definition of $\nabla_M$ demands that $\neg c_i$ also contains $P \nabla_M Q$. However, if $\neg c_i$ does not contain P and Q, then $\neg c_i$ does not need to contain $P \nabla_M Q$ either. FIG. 2 shows two examples for this computation, where C is the care set and M is the derived up-to set. In the left example, since both $\neg c_1$ and $\neg c_2$ (representing areas above the two lines) contain Q (hence P), the result of $P \nabla_M Q$ is the conjunction of $\neg c_1$, $\neg c_2$, and standard widening $P \nabla Q$; the constraint $\neg c_3$ (representing the area below the line) does not contain Q. In the right example, since none of the three constraints $\neg c_1$, $\neg c_2$, $\neg c_3$ contains Q, the widening result is simply $P \nabla Q$ itself, and therefore $(P \nabla_M Q) \cap C \neq \emptyset$.

In general, the up-to set M is weaker than the care set C in restricting the ways overapproximation has to be performed, so there is no guarantee that the widing up-to result does not intersect C. Therefore, it is possible that the reachability fixpoint computation (with widening up-to) after the refinement of care set generates a previously inspected spurious counterexample. As a result, although each individual forward reachability fixpoint computation always terminates, the overall iterative refinement loop may stop making progress (a tradeoff).

Optimizations

Counterexample analysis using precise precondition computations may become computationally expensive. In this section, we present several optimizations to make it faster.

Under-Approximating Backward Analysis

The overhead of counterexample analysis can be reduced by under-approximating the set $B_i$ for $i \leq fi$ and $i > 0$; that is, at each backward step, we compute a subset $B'_i \subseteq B_i$. For instance, $B'_i$ could be a single convex polyhedron when $B_i$ is a finite union of polyhedra. The simplified counterexample analysis is given as follows:

1. $B_{fi} = (\hat{F}_{fi} \cap \neg \psi)$ and $B'_{fi} = subSet(B_{fi})$;
2. $B_{i-1} = \hat{F}_{i-1} \cap pre(B'_i)$ and $B'_{i-1} = subSet(B_{i-1})$ for all $i \leq fi$, if $B'_i \neq \emptyset$.

The correctness of this simplification, that the proof of Theorem 3.2 still holds after we replace $B_i$ with $B'_i$, is due to the following two reasons. First, the precondition is precise in our powerset domain (it would not hold, for instance, in the convex polyhedral lattice where LUB may lose precision). Second, the overall iterative procedure remains correct by adding each time B'i instead of $B_i$ into the care set C—the difference between this simplified version and the original counterexample analysis is that the simplified one uses a more lazy approach for refinement, and it may need more than one refinement pass to achieve the same effect as using $B_i$. When using $B'_i$ instead of $B_i$ to compute the care set, we may not be able to remove the spurious set $B_i \backslash B'_i$ right away. However, if spurious counterexamples leading to $B_i \backslash B'_i$ appear again after refinement, $subSet(B_i \backslash B'_i)$ will be picked up to start computing the new care set.

Finally, if $B'_0 \neq \emptyset$, it guarantees that there is a real counterexample since all precondition computation results, although underapproximated, are accurate. What we miss is the guarantee to find a concrete counterexample during the earliest possible pass, because there may be cases where $B_i \neq \emptyset$ but $B'_i = \emptyset$.

Simplifications of Polyhedral Representations

We now present two heuristic algorithms for simplifying the representations of polyhedra without reducing the accuracy of fixpoint computation. They are orthogonal to the use of extrapolation with a care set.

[Interpolate] Let P and Q be two sets such that $P \subseteq Q$. The interpolate $P \tilde{\Delta} Q$ is a new set such that $P \subseteq (P \tilde{\Delta} Q) \subseteq Q$. The interpolate can be used to simplify the frontier set, i.e., the set for which we compute the postcondition during the forward reachability computation and the set for which we compute the precondition during the backward reachability computation. Let $\hat{F}_{i-1} \hat{F}_i$ be two consecutive sets in this computation. We use $(\hat{F}_i \backslash \hat{F}_{i-1}) \tilde{\Delta} \hat{F}_i$ instead of $\hat{F}_i$ (or the frontier $\hat{F}_i \backslash \hat{F}_{i+1}$) to compute the postcondition. In principle, any set S such that $P \subseteq S \subseteq Q$ can be used as the frontier set without reducing the accuracy of the reachability result. We prefer one with a simpler polyhedral representation.

Algorithm 2. Let $P \subset Q$ be two convex polyhedra. We compute a new polyhedron S by starting with S=P and keep dropping its constraints c as long as $S_{true}{}^c \subset Q$. We return, between Q and S, the one with the least number of constraints.

Figure 3:
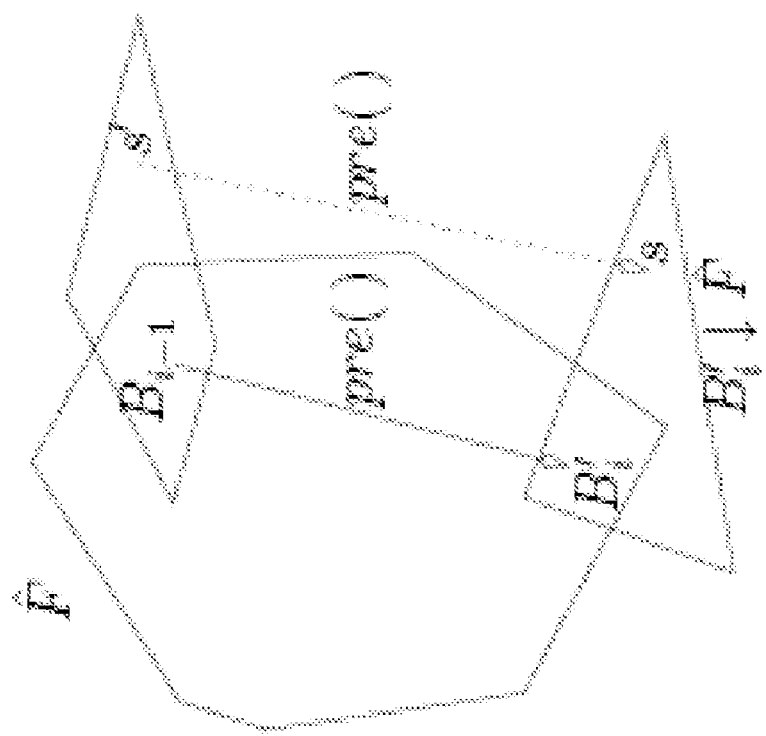
FIG. 3a shows diagrammatically, an example of an interpolate according to the present invention.
FIG. 3b shows diagrammatically, an example of a restrict according to the present invention.
Figure 3:
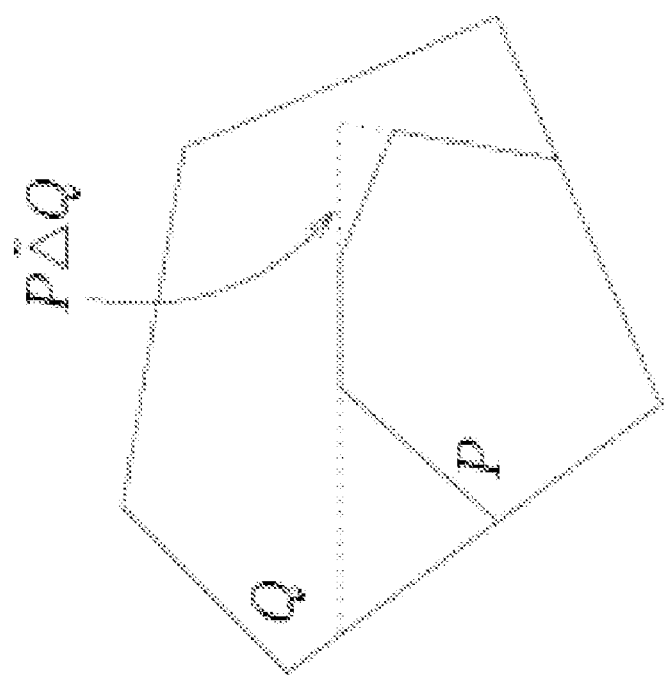

This heuristic algorithm tries to minimize the representation of P by inspecting every constraint greedily. FIG. 3 (a) gives an example for applying this algorithm, where dropping any constraints in $P \tilde{\Delta} Q$ makes the result grow out of Q.

Our definition of $\tilde{\Delta}$ is a generalization of these ideas for abstract domains. Also note that since the purpose here is heuristic simplification, any cheap convex over-approximation technique (instead of a tight convex-hull) can be used to first compute a convex set from $\hat{F}_i \backslash \hat{F}_{i+1}$.

Definition 3 [Restrict] Let P and Q be two sets. The restrict $P \downarrow Q$ is defined as the new set $\{x \in Z^n | x \in P \cap Q, \text{ or } x \notin Q\}$. Restrict computes a simplified set S for P such that (1) its intersection with Q, or $S \cap Q$, equals $P \cap Q$ and (2) S may contain an arbitrary subset of $\neg Q$. Restrict can be used to simplify the preimage set in precondition computation, with respect to a known $\hat{F}$. In counterexample analysis, when computing $B_{i-1} = \hat{F}_{i-1} \subset \text{pre}(B'_i)$, we use $\text{pre}(B'_i \downarrow \hat{F})$ instead of pre ($B'_i$). As is shown in FIG. 3 (b), adding $s \in \neg \hat{F}$ does not add any erroneous states into $\hat{F}$ for $0 \leq k < (i-1)$.

Algorithm 3. Let P and Q be convex polyhedra. We define the computation of $(P \downarrow Q)$ as follows: If $P = Z^n$ or if $Q = \emptyset$, return $Z^n$. Otherwise, in the recursive step, choose a constraint c from P: if $\neg c \cap Q$ is empty, return $(P^c \downarrow Q)$, else return $c \cap (P^c \downarrow (Q \cap c))$.

Figure 4:
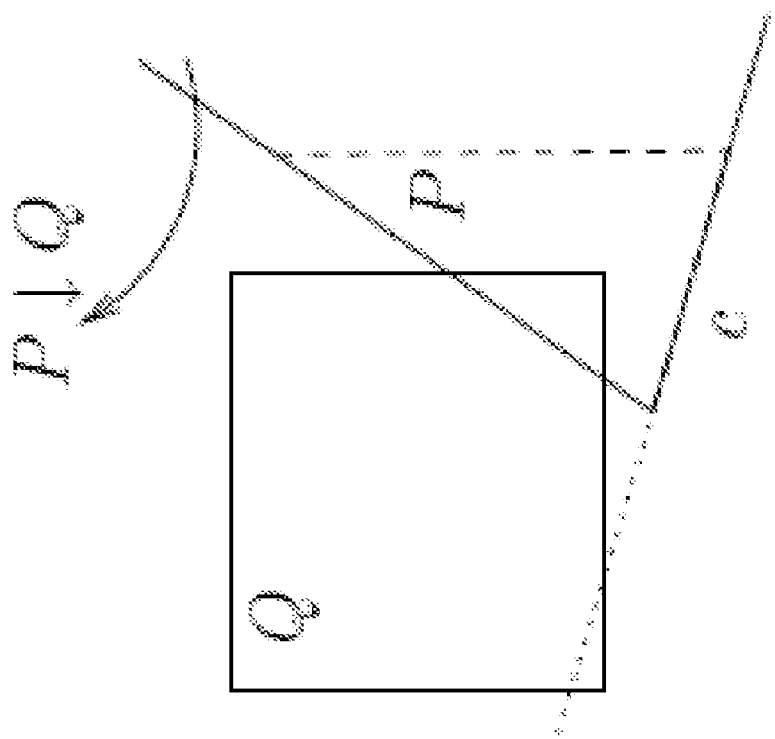
FIG. 4 is a diagrammatic comparison of gist with restrict.
Figure 4:
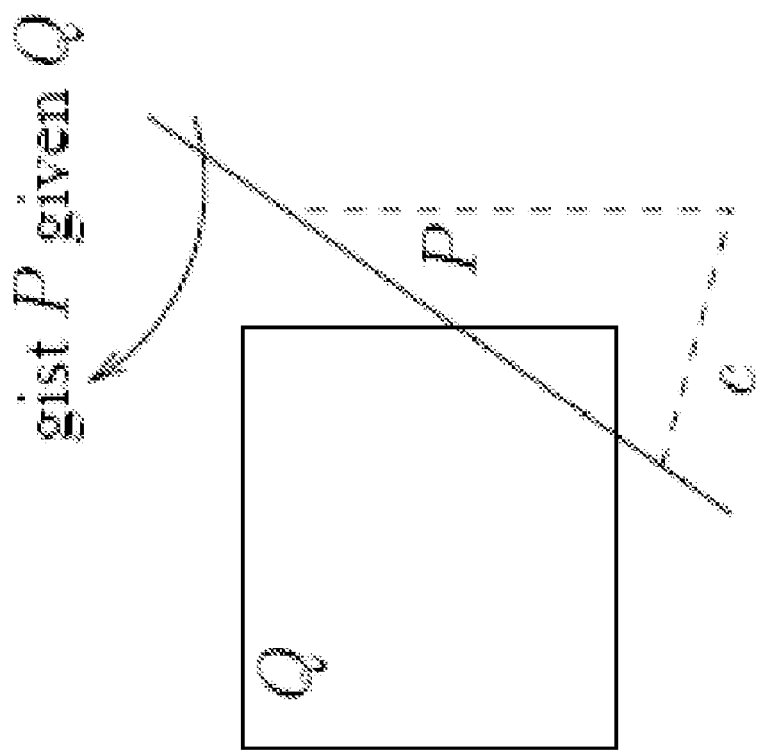

This algorithm is inspired by the gist operator [See, e.g., W. Pugh and D. Wonnacott, "Going Beyond Integer Programming with the Omega Test to Eliminate False Data Dependeces", IEEE Trans. On Parallel and Distributed Systems, 6(2):204-211, 1994], which itself is a restrict operator on polyhedra. In particular, gist P given Q returns a conjunction containing a minimal subset of constraints in P such that (gist P given Q)$\cap Q = P \cap Q$. However, gist in its original form is expensive and not suitable for fast heuristic simplification. In Algorithm 3, we have safely dropped the minimal subset requirement by checking the emptiness of $\neg c \cap Q$ (instead of $P_{\neg_c}{}^c \cap Q$). This may sometimes produce a less compact representation: in FIG. 4, for example, $P \downarrow Q$ (right) has two constraints while the gist result has only one. However, the computation of $P \downarrow Q$ is more efficient and the result remains a generalized cofactor [See, e.g., T. R. Shiple, R. Hojati, A. L. Sangiavanni-vincetelli, and R. K. Brayton, "Heuristic Minimization of BDDs Using Don't Cares", In ACM/IEEE Design Automation Conference, pp 225-231, 1994].

Application in Program Verification

We have implemented the proposed techniques in the F-SOFT [See, e.g., F. Ivancic, I. Shlyakhter, A. Gupta, M. K. Ganai, V. Kahlon, C. Wang, and Z. Yang," Model Checking C Programs Using F-SOFT", In IEEE International Conference on Computer Design, pp. 297-308, 2005] platform. F-SOFT is a tool for analyzing safety properties in C programs, by checking whether certain labeled statements are reachable from an entry point. Techniques from both static analysis and model checking are incorporated. Static analysis is used to quickly filter out properties that can be proved in a numerical abstract domain [See, e.g., S. Sankaranarayanan, F. Ivancic, I. Shlyakhter, and A. Gupta, "Static Analysis in Disjunctive Numerical Domains", In Static Analysis Symposium, 2006]. Unresolved properties are then given to the model checker. Despite these analysis engines and the combination of their complementing strengths, in practice there are still many properties that (1) cannot be proved by static analysis techniques with standard widening, and (2) symbolic model checking takes a long time to terminate because of the large sequential depth and state explosion. Our work aims at resolving these properties using extrapolation with an iteratively improved care set.

Implementation

We incorporated the proposed technique into a symbolic analysis procedure built on top of CUDD [F. Somenzi, "CUDD:CU Desicision Diagram Package", University of Colorado at Boulder, ftp://vlsi.colorado.edu/pub/] and the Omega library, as described in the prior art. It begins with a C program and applies a series of source-level transformations until the program state is represented as a collection of simple scalar variables and each program step is represented as a set of parallel assignments to these variables (each program step corresponds to a basic block). The transformations produce a control flow structure that serves as the starting point for both static analysis and model checking. We use BDDs to track the control flow logic (represented as Boolean functions) and polyhedral powersets to represent numerical constraints of the target program.

The reachable sets (e.g. $\hat{F}_i$) are decomposed and maintained as powersets at the individual program locations (basic blocks), so that each location l is associated with a subset $F_i^l$. Each location l is also associated with a care set $C^l$. Extrapolation with the care set $C^l$ is applied only locally to $F_i^l$ and $F_i^l \cup \text{post}^l(F_i)$, where $\text{post}^l(P_i)$ denotes the subset of postcondition of $F_i$ that resides at the program location l.

During forward reachability computation, we apply extrapolation selectively at certain program locations: We identify back-edges in the control flow graph whose removal will break all the cycles in the control flow. Tails of back-edges serve as the synchronization points in the fixpoint computation. A lock-step style [See, e.g., Z. Yang, C. Wang, F. Ivancic, and A. Gupta, "Mixed Symbolic Representations for Model Checking Software Programs", In International Conference on Formal Methods and Models for Codesign, pp. 17-24, 2006] fixpoint computation is conducted as follows: we use transfer functions on the forward-edges only in the fixpoint computation until it terminates; we propagate the reached state set simultaneously through the back-edges; we then perform forward computation again. Inside this reachability computation framework, we apply extrapolation only at the tails of back-edges and only when we propagate the state sets through back-edges.

Experiments

Our experiments were conducted on a set of control intensive C programs. Among the test cases, bakery is a C model of a well known bakery protocol, with a mutual exclusion property. The teas examples are various versions of the Traffic alert and Collision Avoidance System [See, e.g., A. Coen-Porisine, G. Denaro, C. Ghezzi, and M. Pezze, "Using Symbolic Execution for Verifying Safety-Critical Systems", in European Software Engineering Conference/Foundations of Software Engineering, pp. 142-151, 2001] with properties originally specified in linear temporal logic; we model these properties by adding assertions to the source code to trap the corresponding bugs, i.e., an error exists only if an unsafe statement becomes reachable. The appl examples are from a private embedded software being developed for a portable device. Most of the properties cannot be resolved directly by conventional static analysis techniques (due to the low widening precision).

TABLE 1

Comparing methods for computing reachability fixpoint
(? means unknown)

| Test Program | | | | Analysis Result | | | | Total CPU Time (s) | | | |
| --- | --- | --- | --- | --- | --- | --- | --- | --- | --- | --- | --- |
| | | | widen | extra | MIX | BDD | widen | extra | MIX | BDD |
| name | loc | vars | blks | only | refine | m.c. | m.c. | only | refine | m.c. | m.c. |
| bakery | 94 | 10 | 26 | ? | true | true | true | 18 | 5 | 13 | 2 |
| tcas-1 | 1652 | 59 | 133 | ? | true | true | true | 18 | 34 | 128 | 433 |
| tcas-2 | 1652 | 59 | 133 | ? | true | true | true | 18 | 37 | 132 | 644 |
| tcas-3 | 1652 | 59 | 133 | ? | true | true | true | 18 | 49 | 135 | 433 |
| tcas-4 | 1652 | 59 | 133 | ? | true | true | true | 18 | 19 | 137 | 212 |
| tcas-5 | 1652 | 59 | 133 | ? | false | false | false | 18 | 80 | 150 | 174 |
| appl-a | 1836 | 78 | 307 | true | true | ? | ? | 17 | 22 | >1800 | >1800 |
| appl-b | 1836 | 78 | 307 | ? | false | false | ? | 11 | 94 | 277 | >1800 |
| appl-c | 1836 | 78 | 307 | ? | false | false | ? | 13 | 111 | 80 | >1800 |
| appl-d | 1836 | 78 | 307 | ? | false | false | ? | 13 | 68 | 78 | >1800 |

Our experiments were conducted on a Linux machine with 3 GHz Pentium 4 CPU and 2 GB of RAM. The results are given in Table 1, wherein we list in Columns 1-4 the name, the lines of C code, the number of variables, and the number of basic blocks. These numbers are collected after the test programs have been aggressively simplified using program slicing and constant value propagation. Columns 5-8 indicate the analysis result of four different methods: widen-only denotes an implementation of the standard widening algorithm, extra-refine denotes our new iterative refinement method with the use of care set, MIX denotes a model checking procedure using a combination of BDDs and finte unions of polyhedra, and BDD denotes a symbolic model checker using only BDDs that has been tuned specifically for software models. Columns 9-12 compare the runtime of different methods.

Among the four methods, widen-only is the fastest but also the least precise in terms of the analysis result—it cannot prove any of true properties except appl-a. BDD and MIX are symbolic model checking algorithms, which often take a longer time to complete and are in general less scalable. In contrast, the new method extra-refine achieves a runtime comparable to widen-only and at the same time is able to prove all these true properties. For false properties, widen-only always reports them as "potential errors." The other three methods, extra-refine, MIX, and BDD, are able to produce concrete counterexamples if they complete. Due to state explosion and the large sequential depth of the software models, BDD does not perform well on these properties. Both MIX and extra-refine find all the counterexamples, due to their use of Integer-level representations internally. The method extra-refine has a run time performance comparable to (often slightly better than) that of MIX on these properties, although in appl-c it takes more time to produce a counterexample than MIX due to the overhead of performing multiple forward-backward refinement passes.

Unlike common programming errors such as array bound violations, most properties in the above examples are at the functional level and are harder to prove by using a general-purpose static analyzer only. Although our new method is also based on abstract interpretation, the precision of its extrapolation operator is adaptive and problem-specific, i.e., it adapts to the property at hand through use of counterexamples.

CONCLUSIONS

We have presented a new refinement method to automatically improve the precision of extrapolation in abstract interpretation by iteratively expanding a care set. In so doing, we have presented for the polyhedral domain, a set of algorithms for implementing extrapolation with a care set and for refining the care set using counterexample guided analysis. Our preliminary experimental evaluation shows that the new extrapolation based method can retain the scalability of static analysis techniques and at the same time achieve an accuracy comparable to model checking. For future work, we plan to investigate the use of care sets in other numerical abstract domains including the octagon and interval domains.

At this point, while we have discussed and described our invention using some specific examples, those skilled in the art will recognize that our teachings are not so limited. Accordingly, our invention should be only limited by the scope of the claims attached hereto.

The invention claimed is:

1. An improvement to a computer-implemented method to perform a static analysis on a software program using a fix-point computation using pre-condition or post-condition operations, wherein said method employs an extrapolation operation to accelerate the convergence of the method, wherein said improvement is CHARACTERIZED IN THAT:
    the extrapolation employs a care-set that identifies one or more forbidden areas of extrapolation; and
    outputs an indication of those forbidden areas;
    wherein the extrapolation is performed on convex polyhedra, and P,Q are two polyhedra, and C is a powerset such that $Q \cap C = \emptyset$ wherein the extrapolation of P with respect to Q under the care set C is computed according to the following steps:
        building a new polyhedron P' for each constraint c of P whose half-space does not contain Q, such that if $P^c \cap C = \lbrack$ then c is dropped;
        building a new polyhedron Q' by dropping any constraint c of Q whose half-space does not contain P'; and
        returning Q' as the result of the extrapolation.

2. The method of claim 1 wherein said care set identifies forbidden areas such that the reporting of false bugs is avoided when checking correctness with respect to a given property.

3. The method of claim 2 wherein the care set is incrementally supplemented until a given property is proven correct or a program bug is found.

4. The method of claim 3 wherein the care set is supplemented through the effect of a counterexample analysis.

5. The method of claim 1 wherein given a particular previous known reachable state (P), a post-condition known reachable state (Q), and a particular care set, a direction of growth of the extrapolation is excluded if that direction produces an intersection with the care set.

6. An improved computer implemented method to perform a backward reachability analysis which produces a set of reachable states represented as polyhedra wherein the improvement comprises:
  simplifying the polyhedral representation of pre-image sets through the use of restricts; and
  outputs an indication of the set of reachable states;
  wherein given two sets P and Q, the restrict $P{\downarrow}Q$ is determined to be a new set $\{x \in Z^n | x \in P \cap Q, \text{ or } x \notin Q\}$;
  wherein P and Q are convex polyhedra and $(P{\downarrow}Q)$ is determined according to the following steps:
    If $P=Z^n$ or if $Q=\emptyset$, return $Z^n$;
    Otherwise, in the recursive step, choose a constraint c from P: if $\neg c \cap Q$ is empty, return $(P^c {\downarrow} Q)$, else return $c \cap (P^c {\downarrow} (Q \cap c))$.

* * * * *